(12) United States Patent
Bickford et al.

(10) Patent No.: US 9,940,430 B2
(45) Date of Patent: Apr. 10, 2018

(54) BURN-IN POWER PERFORMANCE OPTIMIZATION

(71) Applicant: International Business Machines Corporation, Armonk, NY (US)

(72) Inventors: Jeanne P. Bickford, Essex Junction, VT (US); Nazmul Habib, South Burlington, VT (US); Baozhen Li, South Burlington, VT (US); Tad J. Wilder, South Hero, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 14/958,869

(22) Filed: Dec. 3, 2015

(65) Prior Publication Data
US 2017/0161426 A1 Jun. 8, 2017

(51) Int. Cl.
*G06F 9/455* (2006.01)
*G06F 17/50* (2006.01)

(52) U.S. Cl.
CPC ...... *G06F 17/5081* (2013.01); *G06F 2217/78* (2013.01)

(58) Field of Classification Search
USPC ........................................................ 716/133
See application file for complete search history.

(56) References Cited

U.S. PATENT DOCUMENTS

| 7,475,366 | B2 | 1/2009 | Kuemerle et al. |
| 8,010,310 | B2 | 8/2011 | Vijayaraghavan et al. |
| 8,386,859 | B2 | 2/2013 | Kursen et al. |
| 8,781,792 | B2 | 7/2014 | Visweswariah et al. |
| 2009/0187368 | A1 | 7/2009 | Jain |
| 2011/0055793 | A1* | 3/2011 | Buck ............... G06F 17/5031 716/136 |
| 2014/0039664 | A1* | 2/2014 | Anemikos ......... G01R 31/2894 700/121 |
| 2014/0100799 | A1 | 4/2014 | Bickford et al. |
| 2014/0107822 | A1* | 4/2014 | Chadwick ......... G01R 31/2872 700/95 |

OTHER PUBLICATIONS

Susan Lichtensteiger et al., "Using Selective Voltage Binning to Maximize Yield", IEEE Transactions on Semiconductor Manufacturing, vol. 26, No. 4, Nov. 2013, pp. 436-441.

* cited by examiner

*Primary Examiner* — Bryce Aisaka
(74) *Attorney, Agent, or Firm* — Law Offices of Ira D. Blecker, P.C.

(57) ABSTRACT

Method of burn-in power optimization which includes: testing integrated circuit devices to record a performance speed for each of the integrated circuit devices; categorizing each integrated circuit device by a selective voltage binning (SVB) process into a voltage bin according to the performance speed of the integrated circuit device; performing a burn-in operation on each of the integrated circuit devices while toggling an SVB performance monitor on each of the integrated circuit devices; testing the plurality of integrated circuit devices after the burn-in operation; categorizing each integrated circuit device into the SVB voltage bin according to the performance speed of the integrated circuit device after the burn-in operation; when the SVB voltage bin after the burn-in operation corresponds to an SVB voltage bin having a slower performance speed than before the burn-in operation, changing the SVB voltage bin to the slower performance speed.

20 Claims, 5 Drawing Sheets

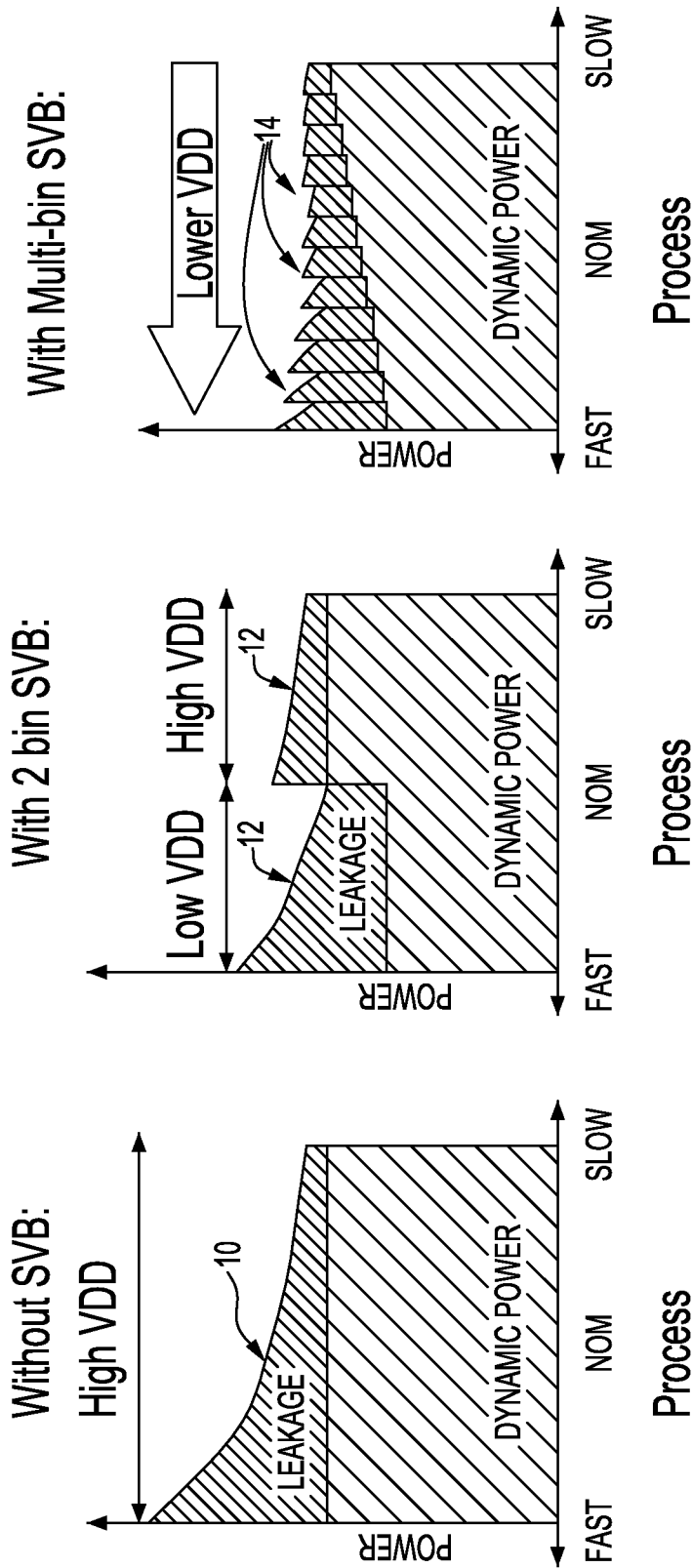

BURN-IN POWER PERFORMANCE OPTIMIZATION

BACKGROUND

The present invention generally relates to selective voltage binning (SVB) of integrated circuits and, more particularly, relates to resetting the SVB bin after burn-in.

Power consumption of integrated circuit devices (e.g., complementary metal oxide semiconductors (CMOS)) consists of two components: dynamic power (i.e., active power) and leakage power (i.e., static power). Dynamic power is the power generated by switching the state of a device (i.e., changing the binary state of one or more device components from high to low or low to high). It is a function of capacitance, voltage, and switching frequency (e.g., $P=CV^nF$, where P is the dynamic power, C is the effective switch capacitance, V is the supply voltage, n is a coefficient greater than or equal to 2, and F is the switching frequency). Leakage power is the power consumed by a device when it is powered but not switching. In an integrated circuit device composed primarily of metal oxide semiconductor field effect transistors, the leakage power varies exponentially from the fast to the slow end of the allowed process window distribution and exponentially as a function of the supply voltage.

Performance for a given semiconductor design varies as a function of the voltage at circuit level. The voltage seen at circuit level is the power supply voltage adjusted for the IR drop associated with the package and on chip circuits. Higher performance is seen at higher voltages and lower performance is seen at lower voltages.

BRIEF SUMMARY

The various advantages and purposes of the exemplary embodiments as described above and hereafter are achieved by providing, according to a first aspect of the exemplary embodiments, a method of burn-in power optimization comprising: testing a plurality of integrated circuit devices to record a performance speed for each of the integrated circuit devices; categorizing each integrated circuit device by a selective voltage binning (SVB) process into a voltage bin according to the performance speed of the integrated circuit device; performing a burn-in operation on each of the integrated circuit devices while toggling an SVB performance monitor on each of the integrated circuit devices; testing the plurality of integrated circuit devices after the burn-in operation to record an updated performance speed for each of the integrated circuit devices; categorizing each integrated circuit device into the SVB voltage bin according to the updated performance speed of the integrated circuit device; when the SVB voltage bin after the burn-in operation corresponds to an SVB voltage bin having a slower performance speed than before the burn-in operation, changing the SVB voltage bin to the slower performance speed; the method being performed by one or more computing devices.

According to a second aspect of the exemplary embodiments, there is provided a computer program product for burn-in power optimization, the computer program product comprising a computer readable storage medium having program instructions embodied therewith, the program instructions executable by a computer processing device to cause the computer processing device to perform a method comprising: testing a plurality of integrated circuit devices to record a performance speed for each of the integrated circuit devices; categorizing each integrated circuit device by a selective voltage binning (SVB) process into a voltage bin according to the performance speed of the integrated circuit device; performing a burn-in operation on each of the integrated circuit devices while toggling an SVB performance monitor on each of the integrated circuit devices; testing the plurality of integrated circuit devices after the burn-in operation to record an updated performance speed for each of the integrated circuit devices; categorizing each integrated circuit device into the SVB voltage bin according to the updated performance speed of the integrated circuit device; when the SVB voltage bin after burn-in corresponds to an SVB voltage bin having a slower performance speed than before the burn-in operation, changing the SVB voltage bin to the slower performance speed.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 1 is a chart illustrating the relationship between process window performance and power for identically manufactured integrated circuit devices.

FIG. 2 is a chart illustrating the relationship between process window performance and power for integrated circuits manufactured with the same process using a 2-bin SVB process.

FIG. 3 is a chart illustrating the relationship between process window performance and power for integrated circuits manufactured with the same process using a multi-bin SVB process.

FIG. 4 is a first exemplary method for resetting the voltage bin after burn-in.

FIG. 5 is an illustration of the practical effect of resetting the voltage bin after burn-in.

FIG. 6 is a second exemplary embodiment for resetting the voltage bin after burn-in.

DETAILED DESCRIPTION

Figure 4:
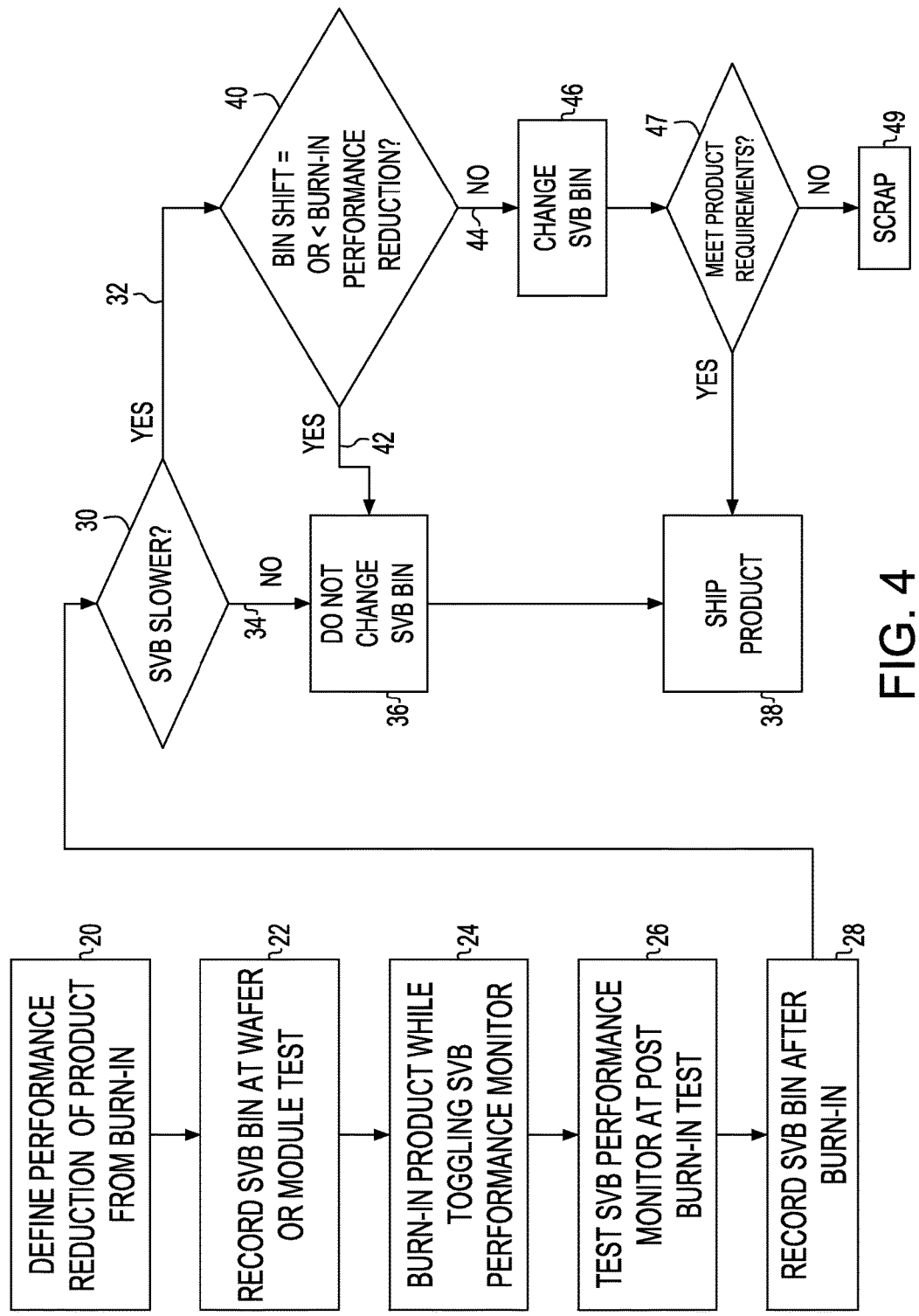

Manufacturing processes result in a variation of one or more physical parameters of devices across the allowed manufacturing process window for the same design. These variations can affect performance (i.e., frequency) of devices. Since semiconductor product design requires that all product that will be shipped to a system application must meet performance requirements, products must meet performance requirements at the slow end of the distribution. This requires that products use higher performance device types that also generate higher power. Use of higher performance/higher power device types at the slow end of the distribution means that the nominal and fast end of the distribution will have more performance than needed to meet system requirements and will have much higher power. While the additional performance is needed at the slow end of the process, device types with higher performance and higher leakage will exceed system performance requirements at the nominal and fast end of the allowed process window distribution and the overall product distribution will have higher power (may consume excessive dynamic power and/or leakage).

SVB is a method to interlock the voltage applied to the semiconductor product with the position of each part in the manufacturing process window such that the system applies a voltage where system performance requirements are met for a particular part. Parts in the faster part of the allowed manufacturing process window are run at lower voltages and parts at the slower end of the process window distribution are run at higher voltages. Since voltage decreases from the fast end of the allowed process window distribution to the slow end of the allowed process window distribution, power and performance at system level are contained to a much narrower band than for products where one voltage is used at system level for all parts in the allowed manufacturing distribution.

To enable SVB, a performance measurement is made on each die/module using a performance screen ring oscillator (PSRO), scan chain, or other performance measurement and the location in the overall allowed manufacturing process window is identified. A bin identifier that can be read at system level is then recorded in each product die (example: eFuse or other circuit) and a table of allowed voltage range for each bin is generated. At system level, the bin identifier is read and voltage is set to allowed voltage range for the designated process window bin. Specifically, slower devices have a higher voltage applied such that the part operates at the required system delay and faster devices have a lower voltage applied such that the part has lower power requirements while still meeting system performance requirements. Therefore, at product test, slower devices are assigned to bins having greater voltage and faster devices are assigned to bins having lower voltage. This reduces the performance and power window observed at system level.

In SVB, testing is performed to determine the respective device performance of individual devices manufactured from the same design. For example, the temperature and voltage of the device may be fixed and the device performance of one or more components of the device may be measured. The devices are sorted into a plurality of voltage bins (i.e., groups) based on their respective device performance. After the devices are sorted into bins, the range of acceptable supply voltages for operating the devices in each voltage bin is determined. In general, the nominal supply voltage for each bin decreases monotonically from the slowest bin to the fastest bin. Since both dynamic power and leakage power increase with increasing supply voltage, a reduction in the required supply voltage will reduce both dynamic and leakage power consumption and, thus, total power consumption. With selective voltage binning, the power supply voltage is adjusted but the at circuit voltage and performance is calculated looking at the voltage drop between the power supply and circuit.

The process of burn-in is valuable in that it promotes early fails of devices due to defects in the devices before the devices may be shipped to customers. However, burn-in ages the devices and decreases performance and leakage power as a function of aging. Parts shipped after burn in have a reduced lifetime at the planned voltages and temperatures used in the system. The performance of a part at a given SVB bin will be less than that observed at T0 and the lifetime of the part will be degraded by the performance degrade generated at burn in.

The present inventors have proposed resetting the SVB bin to correct the performance to the current performance level which may be to an SVB bin corresponding to a slower performance, i.e., a slower SVB bin.

Since the parts have aged, the leakage power for an SVB bin is less after burn in than at T0 and the part can meet the total power requirement for a designated SVB bin while being operated at a higher voltage. Resetting the bin designation to a point where the performance observed on the part corresponds to the T0 expected performance will result in the part at system being operated at a higher voltage such that the T0 performance of the system can be met with little/no leakage screen loss. Furthermore, resetting the SVB bin after burn in will reduce the early life product fails and enhance the overall product reliability.

In the proposed exemplary embodiments, voltage adjustment may be made using the power supply voltage and projecting to at circuit voltage. Strictly speaking, performance for a given integrated circuit device varies as a function of at circuit voltage which correlates to the power supply voltage (considering voltage drop) such that one can modify voltage at the power supply and modulate the at circuit voltage.

Referring to the Figures in more detail, FIG. 1 is a chart illustrating the relationship between process window performance and power for identically manufactured integrated circuit devices. FIG. 2 is a chart illustrating the relationship between process window performance and power for integrated circuits manufactured with the same process using a 2-bin SVB process, and FIG. 3 is a chart illustrating the relationship between process window performance and power for integrated circuits manufactured with the same process using a multi-bin SVB process.

In FIG. 1, the slow-case process range on curve 10 drives the required voltage to meet performance that is ultimately applied in the chip, creating an unnecessarily high operating voltage for products in most of the process window distribution. However, with SVB shown in FIGS. 2 and 3, every chip is tested to measure its process window performance and a process window identifier is created in the chip that will be read at system level. This reduces maximum chip power by running fast process chips at lower Vdd, as shown by curves 12 and 14. Thus, the devices are binned by process, and slow chips that are operated at high Vdd meet power requirements because slow-corner power is not limiting. However, as shown in FIGS. 2 and 3, fast chips are operated at reduced Vdd because the fast chips have performance to spare, and at reduced Vdd, both leakage and dynamic power are reduced.

Referring to FIG. 4, there is illustrated a first method according to the exemplary embodiments. It can be expected that there may be a reduction in performance of an integrated circuit device after burn-in. In a first process, box 20, an acceptable amount of reduction in performance of the integrated circuit device is defined. That is, how much of a decrease in performance (i.e., decrease in frequency) resulting in shifting from one bin to another bin having slower performance is acceptable. This reduction in performance is modelled using device reliability models. The reliability model applies voltage, temperature and burn-in duration and calculates degradation in lifetime (i.e., remaining power on hours or POH). Exact performance degradation mayl vary based on a multitude of process variations. Product exhibiting more degradation than planned likely will have reliability issues as the product ages during system operation and may need to be scrapped.

In a next process, box 22, the current SVB bin corresponding to the current performance of the integrated circuit device is recorded. In this process and the following processes of the method, the processes may be performed at the wafer level or at the module level (i.e., after the integrated circuit device has been bonded to an electronic substrate).

The integrated circuit device may then undergo a burn-in process, box 24. Burn-in is a conventional process wherein the integrated circuit device may be driven at a higher than normal temperature and at a higher than normal operating voltage in order to induce fails of marginal parts.

The burn-in may occur while toggling an SVB performance monitor on the integrated circuit device box. In one example, the SVB performance monitor may be a ring oscillator on each integrated circuit device. "Toggling" of the SVB performance monitor may be understood to mean that the ring oscillator monitors that the integrated circuit device has been turned on and off at least once and that the toggle rate matches that applied to active circuits in the product during burn in such that the performance degrade of the performance monitor matches the degrade seen in the active product circuits.

The method may further include testing the SVB performance monitor (i.e., the ring oscillator for example), box 26, to measure the device performance degrade generated by burn in.

The device performance monitor(s) are tested after burn-in and their SVB bin after burn-in is recorded, box 28.

The SVB bin before burn-in is compared with the SVB bin after burn-in. In decision box 30, if the SVB bin of the integrated circuit device corresponds to a slower performance, the method follows the "YES" path, 32. If the SVB bin of the integrated circuit device corresponds to no decrease in performance, the method follows the "NO" path, 34.

Considering the "NO" path 34 first, if there is no decrease in performance, then the SVB bin is not changed, box 36. The integrated circuit device is then eligible to be shipped, box 38.

Considering now the "YES" path 32, the process proceeds to decision box 40. The change in SVB bin after burn-in is compared with the acceptable performance reduction previously discussed with respect to the process in box 20. If the change in SVB bin to a slower bin is equal to or less than the acceptable bin shift due to lower post burn-in performance, then the process proceeds down the "YES" path 42, the SVB bin is not changed, box 36 and the integrated circuit device is then eligible to be shipped, box 38.

Returning to decision box 40, when the change in SVB bin after burn-in is greater than the acceptable bin shift due to lower post burn-in performance, then the process proceeds down the "NO" path 44, the SVB bin is changed, box 46, to the current bin. If the post burn-in bin shift puts the integrated circuit device outside of the product requirements, box 47, the "NO" path is followed and the integrated circuit device is scrapped, box 49. If the integrated circuit device meets product requirements, box 47, then the integrated circuit device is eligible to be shipped, box 38.

Figure 5:
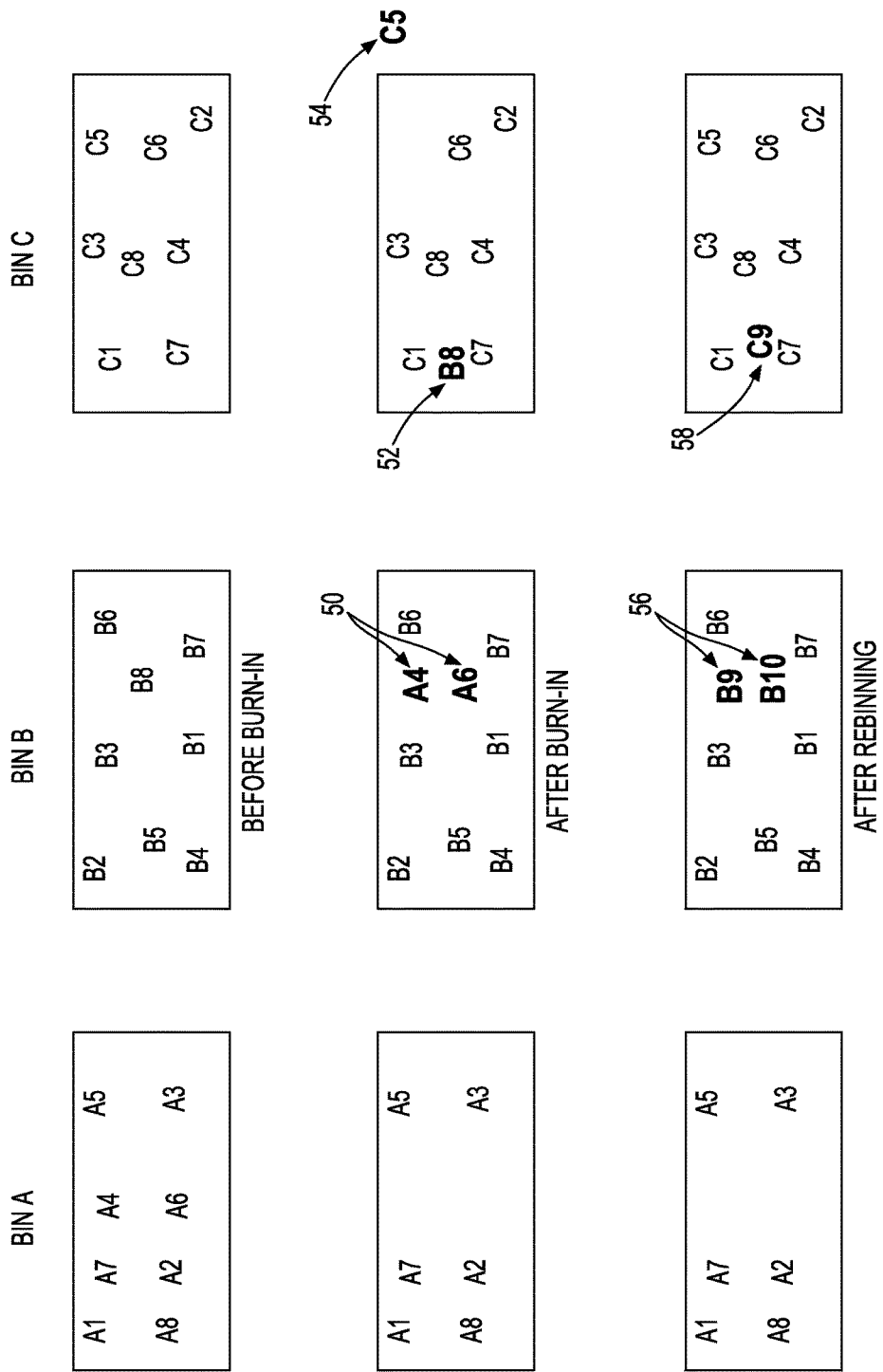

FIG. 5 is an illustration of the practical operation of the exemplary embodiments. Shown in FIG. 5 are three SVB bins, Bin A, Bin B and Bin C where Bin A corresponds to the faster performance of integrated circuit devices and Bin C corresponds to the slower performance of integrated circuit devices. Bin B is intermediate in performance between Bin A and Bin C.

Before burn-in, Bin A contains integrated circuit devices A1 to A8, Bin B contains integrated circuit devices 131 to B8 and Bin C contains integrated circuit devices C1 to C8. Before burn-in, the performance of all of the integrated circuit devices in Bins A to C have been recorded.

After burn-in, some of the integrated circuit devices may have become slower. That is, the performance of integrated circuit devices A4 and A6, indicated by arrows 50, may have suffered a decrease in performance such that when their SVB bin is recorded after burn-in, integrated circuit devices A4 and A6 may have now moved from Bin A to Bin B. In a similar manner, integrated circuit device B8, indicated by arrow 52, has now moved from Bin B to Bin C. Integrated circuit device C5, indicated by arrow 54, has suffered a decrease in performance and may now be below the slowest edge of Bin C so as to now be outside Bin C and may no longer meet product requirements. Since there are no slower bins than Bin C, integrated circuit device C5 may be scrapped.

According to the exemplary embodiments, all of the integrated circuit devices A4, A6 and B8 may stay in their slower bins. After re-binning, integrated circuit devices A4 and A6 may now become integrated circuit devices B9 and B10, indicated by arrows 56 in Bin B and integrated circuit device B8 may now become integrated circuit device C9, indicated by arrow 58, in Bin C.

Figure 6:
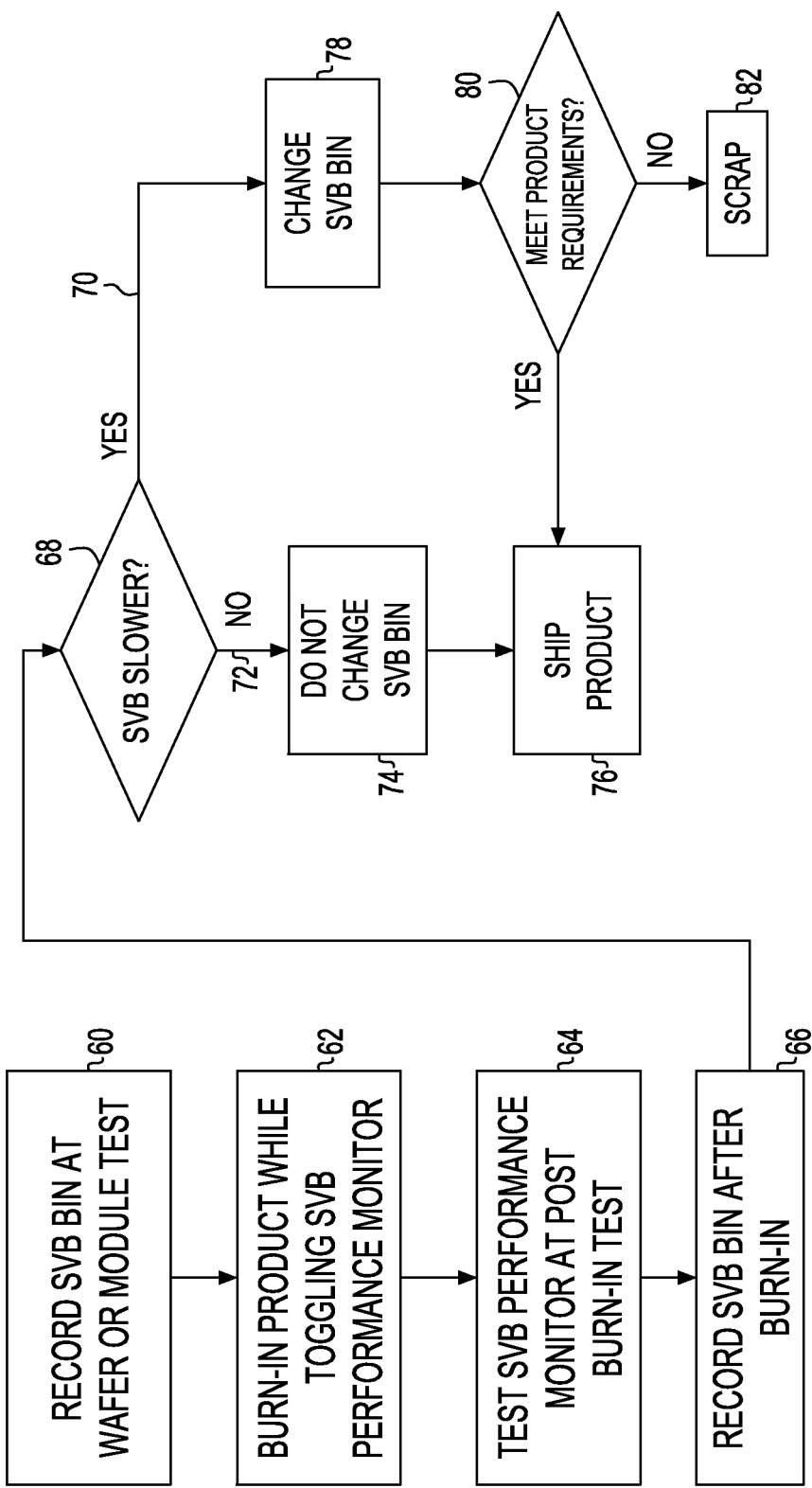

Referring to FIG. 6, there is illustrated a second method according to the exemplary embodiments in which a performance reduction metric is not initially defined.

In a first process, box 60, the current SVB bin corresponding to the current performance of the integrated circuit device is recorded. In this process and the following processes of the method, the processes may be performed at the wafer level or at the module level (i.e., after the integrated circuit device has been bonded to an electronic substrate).

The integrated circuit device may then undergo a burn-in process, box 62. The burn-in process is as described above.

The burn-in may occur while toggling an SVB performance monitor on the integrated circuit device. In one example, the SVB performance monitor may be a ring oscillator on each integrated circuit device. "Toggling" of the SVB performance monitor to match the toggle rate used for active circuits in the product is as described above.

The method may further include testing the SVB performance monitor (i.e., the ring oscillator for example), box 64, to make sure that the toggle rate applied to the SVB performance monitor matches that applied to active circuits in the product during burn in such that the performance degrade of the performance monitor matches the degrade seen in the active product circuits.

The SVB performance monitor(s) are tested after burn-in and their SVB bin after burn-in is recorded, box 66.

The SVB bin before burn-in is compared with the SVB bin after burn-in. In decision box 68, if the SVB bin of the integrated circuit device corresponds to a slower performance, the method follows the "YES" path, 70. If the SVB bin of the integrated circuit device corresponds to no decrease in performance, the method follows the "NO" path, 72.

Considering the "NO" path 72 first, if there is no decrease in performance, then the SVB bin is not changed, box 74. The integrated circuit device is then eligible to be shipped, box 76.

Considering now the "YES" path 70, the process proceeds to change the SVB bin to the current bin, box 78. If the post burn-in bin shift puts the integrated circuit device outside of the product requirements, box 80, the "NO" path is followed and the integrated circuit device is scrapped, box 82. If the integrated circuit device meets product requirements, box 80, then the integrated circuit device is eligible to be shipped, box 76.

Figure 7:
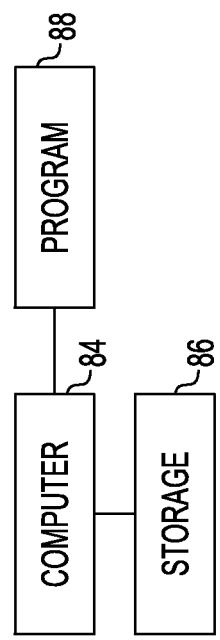
FIG. 7 is an exemplary hardware environment for practicing the exemplary embodiments.

The computing devices implementing the exemplary embodiments may be a general-purpose computer or a special purpose device such as a hand-held computer. FIG. 7 is a block diagram that illustrates one exemplary hardware environment of the computing devices. The exemplary embodiments may be implemented using a computer 84 comprised of a microprocessor, random access memory (RAM), read-only memory (ROM) and other components. The computer 84 may be a personal computer, server, mainframe computer, hand-held device or other computing device. Resident in the computer 84, or peripheral to it, may be a storage device 86 of some type such as a hard disk drive, floppy disk drive, CD-ROM drive, tape drive or other storage device.

Generally speaking, the software implementation of the exemplary embodiments, program 88 in FIG. 7, may be tangibly embodied in a computer-readable medium such as one of the storage devices 86 mentioned above. The program 88 may comprise instructions which, when read and executed by the microprocessor of the computer 84, may cause the computer 84 to perform the steps necessary to execute the steps or elements of the exemplary embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of burn-in power optimization comprising:
    testing a plurality of integrated circuit devices to record a performance speed for each of the integrated circuit devices;
    categorizing each integrated circuit device by a selective voltage binning (SVB) process into a voltage bin only according to the performance speed of the integrated circuit device;
    performing a burn-in operation on each of the integrated circuit devices while toggling an SVB performance monitor on each of the integrated circuit devices;
    testing the plurality of integrated circuit devices after the burn-in operation to record an updated performance speed for each of the integrated circuit devices;
    categorizing each integrated circuit device by the SVB process into the SVB voltage bin only according to the updated performance speed of the integrated circuit device;
    when the SVB voltage bin after the burn-in operation corresponds to an SVB voltage bin having a slower performance speed than before the burn-in operation, changing the SVB voltage bin to the slower performance speed;
    the method being performed by one or more computing devices.

2. The method of claim 1 further comprising testing the SVB performance monitor after the burn-in operation to measure a device performance degrade generated by the burn-in operation.

3. The method of claim 1 further comprising scrapping the integrated circuit device when the changed SVB voltage bin is slower than a minimum product requirement.

4. The method of claim 1 wherein categorizing the each integrated circuit device by an SVB process is at a wafer test.

5. The method of claim 1 wherein categorizing the each integrated circuit by an SVB process is at a module test.

6. The method of claim 1 further comprising defining a performance reduction metric of an acceptable decrease in performance speed resulting from burn-in of an integrated circuit device and wherein when the SVB voltage bin after burn-in corresponds to an SVB voltage bin having a slower performance speed than before burning-in, changing the SVB voltage bin when the integrated circuit device after burn-in has a performance speed decrease greater than the performance reduction metric.

7. The method of claim 6 further comprising testing the SVB performance monitor after the burn-in operation to measure a device performance degrade generated by the burn-in operation.

8. The method of claim 6 further comprising scrapping the integrated circuit device when the changed SVB voltage bin is slower than a minimum product requirement.

9. The method of claim 6 wherein categorizing the each integrated circuit device by an SVB process is at a wafer test.

10. The method of claim 6 wherein categorizing the each integrated circuit by an SVB process is at a module test.

11. A computer program product for burn-in power optimization, the computer program product comprising a computer readable storage medium having program instructions embodied therewith, the program instructions executable by a computer processing device to cause the computer processing device to perform a method comprising:
    testing a plurality of integrated circuit devices to record a performance speed for each of the integrated circuit devices;
    categorizing each integrated circuit device by a selective voltage binning (SVB) process into a voltage bin only according to the performance speed of the integrated circuit device;
    performing a burn-in operation on each of the integrated circuit devices while toggling an SVB performance monitor on each of the integrated circuit devices;
    testing the plurality of integrated circuit devices after the burn-in operation to record an updated performance speed for each of the integrated circuit devices;
    categorizing each integrated circuit device by the SVB process into the SVB voltage bin only according to the updated performance speed of the integrated circuit device;
    when the SVB voltage bin after burn-in corresponds to an SVB voltage bin having a slower performance speed than before the burn-in operation, changing the SVB voltage bin to the slower performance speed.

12. The method of claim 11 further comprising testing the SVB performance monitor after the burn-in operation to measure a device performance degrade generated by the burn-in operation.

13. The method of claim 11 further comprising scrapping the integrated circuit device when the changed SVB voltage bin is slower than a minimum product requirement.

14. The method of claim 11 wherein categorizing the each integrated circuit device by an SVB process is at a wafer test.

15. The method of claim 11 wherein categorizing the each integrated circuit by an SVB process is at a module test.

16. The method of claim 11 further comprising defining a performance reduction metric of an acceptable decrease in performance speed resulting from burn-in of an integrated circuit device and wherein when the SVB voltage bin after burn-in corresponds to an SVB voltage bin having a slower performance speed than before burning-in, changing the SVB voltage bin when the integrated circuit device after burn-in has a performance speed decrease greater than the performance reduction metric.

17. The method of claim 16 further comprising testing the SVB performance monitor after the burn-in operation to measure a device performance degrade generated by the burn-in operation.

18. The method of claim 16 further comprising scrapping the integrated circuit device when the changed SVB voltage bin is slower than a minimum product requirement.

19. The method of claim 16 wherein categorizing the each integrated circuit device is at a wafer test.

20. The method of claim 16 wherein categorizing the each integrated circuit is at a module test.

* * * * *